United States Patent
Sloot et al.

(10) Patent No.: US 9,295,354 B2
(45) Date of Patent: Mar. 29, 2016

(54) METHOD AND DEVICE FOR COOKING FOOD SUCH AS RICE

(75) Inventors: Eric Mark Sloot, Drachten (NL); Fred Fraij, Drachten (NL); Klaas Kooijker, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1385 days.

(21) Appl. No.: 12/670,140

(22) PCT Filed: Jul. 25, 2008

(86) PCT No.: PCT/IB2008/052991
§ 371 (c)(1),
(2), (4) Date: Jan. 22, 2010

(87) PCT Pub. No.: WO2009/016566
PCT Pub. Date: Feb. 5, 2009

(65) Prior Publication Data
US 2010/0196572 A1    Aug. 5, 2010

(30) Foreign Application Priority Data
Jul. 31, 2007 (EP) .................... 07113471

(51) Int. Cl.
A47J 27/62 (2006.01)
A47J 27/04 (2006.01)
A47J 27/08 (2006.01)

(52) U.S. Cl.
CPC .............. *A47J 27/04* (2013.01); *A47J 27/0802* (2013.01)

(58) Field of Classification Search
USPC ....... 99/331, 333, 348, 403–410, 417, 443 R, 99/443 C, 483, 516, 330, 334–336; 219/389, 433, 435, 506, 440–442, 492, 219/494, 400, 401, 434; 426/231, 233, 508, 426/523, 510, 509, 511, 461, 462, 618; 392/465; 968/977, DIG. 1; 340/650, 340/660

See application file for complete search history.

(56) References Cited

U.S. PATENT DOCUMENTS

| | | | |
|---|---|---|---|
| 5,442,997 A * | 8/1995 | Branz et al. .................... 99/330 |
| 6,152,024 A | 11/2000 | Tippmann | |
| 6,723,963 B2 | 4/2004 | Ronda | |
| 2002/0112612 A1* | 8/2002 | Cusenza et al. ............... 99/330 |
| 2006/0254429 A1 | 11/2006 | Sinton | |

FOREIGN PATENT DOCUMENTS

| | | | |
|---|---|---|---|
| EP | 1731840 A1 | 12/2006 | |
| JP | 63309210 A | 12/1988 | |
| JP | 02255113 A | 10/1990 | |
| JP | 07246157 A * | 9/1995 | ............. A47J 27/16 |

(Continued)

*Primary Examiner* — Thien S Tran

(57) ABSTRACT

A device for cooking food such as rice is configured to perform a cooking process which is performed by heating the food under the influence of boiling water during a period of time. The device includes a controller for controlling an operation of the device. The controller is configured o operate components of the device in such a way that a total quantity of water to be used in the cooking process is gradually supplied to the food. The supply of a major portion of the total quantity of the water is performed when the cooking process is already taking place. In one embodiment, the cooking process is initiated by evaporating a relatively small portion of the total quantity of the water to steam, supplying this steam to the food, and allowing this steam to condense on the food.

7 Claims, 2 Drawing Sheets

(56) References Cited

FOREIGN PATENT DOCUMENTS

| | | | |
|---|---|---|---|
| JP | 9065972 | A1 | 3/1997 |
| JP | 09065972 | A * 11/1997 .............. A47J 27/00 |
| JP | 11239730 | A | 9/1999 |
| JP | 2002058598 | A | 2/2001 |
| WO | 9506416 | A1 | 3/1995 |
| WO | 0139640 | A2 | 6/2001 |

* cited by examiner

METHOD AND DEVICE FOR COOKING FOOD SUCH AS RICE

FIELD OF THE INVENTION

The present invention relates to a method of cooking food such as rice, wherein an actual cooking process is performed by heating the food under the influence of boiling water during a period of time. Furthermore, the present invention relates to a device for cooking food such as rice, comprising a space for accommodating food, means for supplying water to the space, means for generating heat, and means for controlling a cooking process of the food.

BACKGROUND OF THE INVENTION

A method of cooking food, in particular a grain such as rice, is generally known, and may be carried out by a device which is adapted to be filled with quantities of food and water. For the purpose of cooking rice, many types of rice cookers are available, including electrical rice cookers which comprise electrical heating elements for providing the heat that is necessary in a cooking process, and means for controlling the cooking process. In the case of a conventional electrical rice cooker, when a user wants to cook a quantity of rice, the user fills a space of the rice cooker with the quantity of rice and an appropriate quantity of water, and subsequently activates the rice cooker to heat the mixture of rice and water during a period of time. During operation of the rice cooker, the mixture of rice and water is heated to such an extent that the water starts to boil, so that the rice is continuously heated at the boiling temperature of the water.

According to a known method of decreasing the period of time during which the rice is cooked, a rice cooking process is performed at a higher temperature. In normal circumstances, the boiling temperature of water is 100° C., but, according to thermodynamic laws, the boiling temperature is increased when ambient pressure is increased. In view of this, rice cookers which are adapted to be used as a pressurized cooking pan have been developed. Usually, a pressurized rice cooker comprises a mechanism for firmly pressing a lid of the pan in a position for closing the pan. Pressure is built up during a cooking process on the basis of the formation of steam which takes place during a boiling process of the water, as this steam is not allowed to escape from the pan. In this way, the boiling point of the water may be increased to 110-120° C., namely when a pressure up to about 2 bar is realized.

In a conventional rice cooker, heating up the mixture of rice and water takes approximately 10 minutes, and an actual rice cooking process takes approximately 20 minutes. In a pressurized rice cooker, when the water is boiled to a temperature of 100-120° C., the actual rice cooking process only takes approximately 10 minutes. This means that the total time that is needed for cooking rice is considerably reduced. However, the heating up of the mixture of rice and water for the purpose of initiating an actual cooking process still takes approximately 10 minutes. Hence, in a pressurized rice cooker, the time needed for initiating a cooking process is in the same order as the time needed for performing the actual cooking process.

SUMMARY OF THE INVENTION

It is an objective of the present invention to provide measures for reducing the time that is needed for initiating an actual cooking process in a device for cooking food, in particular a grain such as rice. This objective is achieved by providing a method of cooking food, wherein an actual cooking process is performed by heating the food under the influence of boiling water during a period of time, wherein a total quantity of water which is to be used in the process is gradually supplied to the food, and wherein the supply of a major portion of the total quantity of the water is performed when the cooking process is taking place.

It is noted that within the scope of the present invention, the food to be cooked may be rice, but that this is not necessarily the case, as the present invention is also applicable in a context of other types of food.

The present invention provides a method that is different from the conventional method of supplying a total quantity of water needed for cooking an intended quantity of food to the food all at once, and subsequently heating the obtained mixture of food and water. Instead, the water is gradually supplied to the food. In this way, it is possible to initiate an actual cooking process by only supplying a relatively small portion of the total quantity of water, the supply of the rest of this quantity, which is a major portion of this quantity, being performed during the cooking process. Thus, by carrying out the method according to the present invention, it is achieved that an actual cooking process is initiated much faster than by carrying out a conventional method, as, in comparison with the latter method, there is no need for heating up a mixture of the food and the total quantity of the water first. A most effective speeding up of the overall cooking process is achieved when the water is heated before being supplied to the food. It is particularly advantageous to heat the water that is supplied when a cooking process is already going on, as in that case, interruption of the cooking process as a result of a supply of water is avoided. Due to the fact that heating of the water takes place in parallel with the actual cooking process, much time is saved in comparison with conventional heating of the water prior to the actual cooking process.

The time that is needed for initiating the actual cooking process may be considerably reduced when a first portion of the total quantity of the water is supplied to the food in the form of steam. In general, generating steam and allowing the steam to condense on food is a very fast manner of heating up the food to about 100° C. Steam generation does not need to take more than 2 minutes, while the heating process of the food, which is the result of condensing of the steam, only takes a few seconds.

In a practical way of carrying out the method according to the present invention, the food is cooked in a device comprising a space for accommodating a quantity of the food, means for supplying water to the space, and means for generating heat. When the device as mentioned is applied, the actual cooking process may be initiated by carrying out a preparatory process during which the water supplying means are operated to supply water to the food that is present in the space of the device, in which case the heat generating means are operated to heat the water to steam in order to let the supply of water take place in the form of a supply of steam, and the water supplying means may be operated to supply water to the food that is present in the space of the device during the actual cooking process as well, in which case the heat generating means are operated to heat the water in order to let the supply of water take place in the form of a supply of hot water.

When the steps as mentioned are performed, heat generating means of the device are operated, and steam is generated and supplied to the food in order for the food to heat up and the actual cooking process to get started. Subsequently, the rest of the water needed for cooking the food is supplied to the food, which water is heated to an appropriate temperature, so that the cooking process may be continuous and is not disturbed when more and more water is added. The cooking process is already initiated when the steam is supplied to the food, and the extra time needed besides the time of the actual cooking process is as long as the time needed for generating the steam. This time does not need to be long; for example, in case the food is rice, 1 kilogram of food may be heated up by steam that is generated on the basis of 70 milliliters of water, which does not need to take more than 2 minutes in case the power is a common 1,400 W. After the cooking process has been initiated, heating the remaining quantity of water that needs to be supplied to the food takes place during the cooking process, so that the process of heating this quantity of water, which is the major portion of the total quantity of water, does not add time.

Preferably, the device applied is a pressurized device. In other words, it is preferred that the space for accommodating a quantity of food is sealed in order to realize a build-up of pressure inside the space during the cooking process. In this way, a maximum reduction of the cooking time may be achieved, as the boiling temperature of the water is increased under the influence of the pressure, so that the cooking process is performed at a higher temperature.

When the food is first heated up under the influence of steam and subsequently heated under the influence of boiling water, hot water being supplied to the food during the latter heating process, a transition from a supply of steam to a supply of water is effected. This transition may take place by decreasing the power level at which the heat generating means are operated and/or by increasing the mass flow rate at which the water supplied to the food is made to flow through an area that is associated with the heat generating means. In any case, the transition may take place by reducing the extent to which water that is supplied to the food is allowed to accumulate heat.

The method according to the present invention is intended to be carried out in a device having means for controlling an operation of the device, wherein the controlling means are adapted to operate components of the device for carrying out the method. The device may further comprise a space for accommodating food, means for supplying water to the space, and means for generating heat, and the controlling means may be adapted to first operate the water supplying means to supply water to the space for accommodating food while operating the heat generating means to heat the water to steam in order to let the supply of water take place in the form of a supply of steam, and to subsequently operate the water supplying means to supply water to the space for accommodating food while operating the heat generating means to heat the water in order to let the supply of water take place in the form of a supply of hot water. It has already been explained that first supplying steam to the food for the purpose of quickly heating up the food under the influence of condensation of the steam on the food and subsequently supplying hot water to the food during the actual cooking process which is initiated in this way causes the total time needed for cooking the food to be relatively short, so that the objective of the present invention is achieved.

For the purpose of realizing a transition from a supply of steam to a supply of hot water, the controlling means of the device may be adapted to operate the heat generating means at different power levels during a cooking process, wherein a first power level is higher than a subsequent power level. Additionally or alternatively, the controlling means may be adapted to control the mass flow rate at which the water that is supplied to the space for accommodating food is made to flow through an area that is associated with the heat generating means, the first mass flow rate being lower than a subsequent mass flow rate.

The device according to the present invention does not necessarily need to be a pressurized cooking device, but in view of the desired reduction of time needed for cooking food in the device, this is a preferred option.

Within the scope of the present invention, various practical embodiments of the heat generating means of the device are feasible. For example, a flow-through heater for heating the water that is supplied to the space for accommodating food may be applied, and at least one additional heater that is associated with the space may be applied. Also, it is possible that the heat generating means comprise a thermo block which is associated with the space, which thermo block may have the combined function of heating the water that is supplied to the space and heating the content of the space.

In a practical embodiment, the device according to the present invention comprises a water reservoir and means for pumping water from the water reservoir in the direction of the space for accommodating food. In such a case, a user of the device only needs to fill the space of the device with a desired quantity of food to be cooked, fill the water reservoir with at least an appropriate quantity of water, and start the operation of the device for the purpose of cooking the food, the cooking process being automatically performed by the device without the need of any further action from the user.

The above-described and other aspects of the present invention will be apparent from and elucidated with reference to the following description of two embodiments of a rice cooker according to the present invention.

BRIEF DESCRIPTION OF THE DRAWINGS

The present invention will now be explained in greater detail with reference to the Figures, in which equal or similar parts are indicated by the same reference signs, and in which.

DETAILED DESCRIPTION OF EMBODIMENTS

Figure 1:
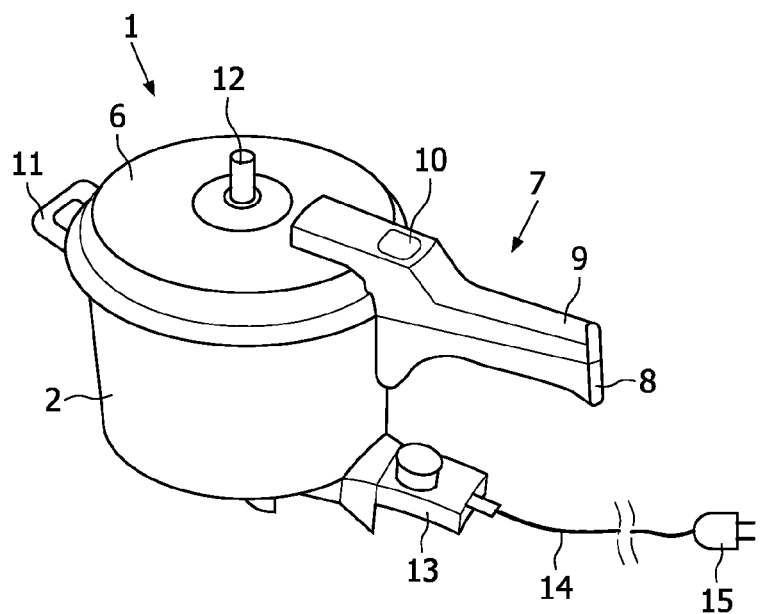
FIG. 1 diagrammatically shows a perspective view of a pressurized rice cooker according to the state of the art.

Prior to a detailed description of two embodiments of a rice cooker according to the present invention, general features of a pressurized rice cooker will be explained on the basis of FIG. 1, which shows a pressurized rice cooker 1 according to the state of the art, and FIG. 2, which shows a number of components of the rice cooker 1.

Two main components of the rice cooker 1 are a bowl 2 having a space 3 for accommodating quantities of rice 4 and water 5 and a lid 6 for covering an open side of the bowl 2, thereby sealing the space 3. A position of the lid 6 with respect to the bowl 2 as shown in FIG. 1 is the position for sealing the space 3. For the purpose of keeping the lid 6 fixed in this position, which is also referred to as closed position, the rice cooker 1 is equipped with a lid locking mechanism 7. In particular, this mechanism 7 comprises a first element 8 that is arranged on the bowl 2 and a second element 9 that is arranged on the lid 6, the elements 8, 9 being adapted to engage each other when being put together. An engaged configuration of the elements 8, 9 is shown in FIG. 1. In the shown example, the lid locking mechanism 7 comprises a button 10 which may be depressed by a user of the rice cooker 1 for the purpose of activating a mechanism (not shown) for releasing the engagement of the elements 8, 9.

Advantageously, the elements 8, 9 of the lid locking mechanism 7 have an elongated shape and protrude with respect to the circumference of the rice cooker 1, as shown in FIG. 1, so that the elements 8, 9 may also have a function as handle that may be taken hold of by a user. Besides the components already mentioned, the rice cooker 1 further comprises components like a handle 11 that is arranged on the bowl 2 and that serves for facilitating handling of the bowl 2 or the entire rice cooker 1 by a user, a knob 12 that is arranged on top of the lid 6 and that serves for facilitating handling of the lid 6 by a user, and a unit 13 that serves for receiving input from a user in relation to a cooking process. For example, the unit 13 comprises an on/off switch and a knob by means of which the user may adjust parameters of the cooking process. Furthermore, as the rice cooker 1 is an electrical device, the rice cooker 1 comprises an electrical cord 14 and a plug 15.

Figure 2:
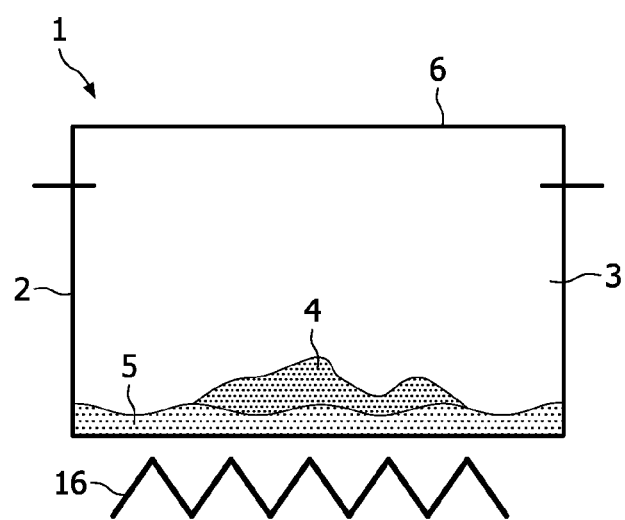
FIG. 2 diagrammatically shows a number of components of the rice cooker shown in FIG. 1.

With reference to FIG. 2, it is noted that the rice cooker 1 comprises a heating element 16 that is positioned at the bottom of the bowl 2. When the rice cooker 1 is operated, the heating element 16 provides the heat that is necessary for cooking the rice 4.

When a user decides to cook a quantity of rice 4 by means of the rice cooker 1, the following actions are taken. In the first place, the user puts the quantity of rice 4 and an appropriate quantity of water 5 in the bowl 2. Subsequently, the user puts the lid 6 of the rice cooker 1 in the closed position, and takes care that the elements 8, 9 of the lid locking mechanism come into engagement with each other by putting the lid 6 in such a position on the bowl 2 that the elements 8, 9 are put together. At that moment, the cooking process may be started. If necessary, the user adjusts settings of the rice cooker 1, and then puts the rice cooker 1 to an activated state, in which the heating element 16 is switched on.

Under the influence of the heat that is generated by the heating element 16, the rice 4 and the water 5 are heated up. At a certain point, the water 5 starts to boil, so that the temperature at which the cooking process takes place corresponds to the temperature of the boiling point of the water 5. However, this temperature is higher than the normal temperature of 100° C., as the pressure in the rice cooker 1 is higher than the normal ambient pressure of approximately 1 bar. This is due to the fact that steam that is obtained as a consequence of the boiling of the water 5 is trapped inside the space 3 of the bowl 2, as this space 3 is sealed by the lid 6. For example, the pressure may rise to a value of approximately 2 bar, as a result of which the rice 4 is cooked at a temperature of approximately 110-120° C.

On the basis of the higher temperature, the cooking process takes less time than a cooking process which takes place under normal ambient pressure. Normally, heating up the mixture of rice 4 and water 5 and initiating the actual cooking process, during which the water 5 is boiling, takes approximately 10 minutes. Cooking the rice 4 under the influence of water 5 that is boiling at the normal temperature of 100° C. takes approximately 20 minutes, whereas cooking the rice 4 under the influence of water 5 that is boiling at an increased temperature of 110-120° C. takes approximately 10 minutes, so that a time reduction of approximately 10 minutes is realized on a total of approximately 30 minutes. When a pressure of approximately 3 bar is realized in the rice cooker 1, the time reduction may even be approximately 15 minutes, as cooking the rice 4 under the influence of boiling water takes approximately 5 minutes at such a pressure.

Like the rice cooker 1 according to the state of the art, the rice cooker according to the present invention comprises a bowl 2 having a space 3, and a lid 6 for sealing the space 3. However, some important differences between the rice cooker 1 according to the state of the art and the rice cooker according to the present invention exist, which will become apparent from the following description of two embodiments of the rice cooker according to the present invention on the basis of FIGS. 3 and 4.

Figure 3:
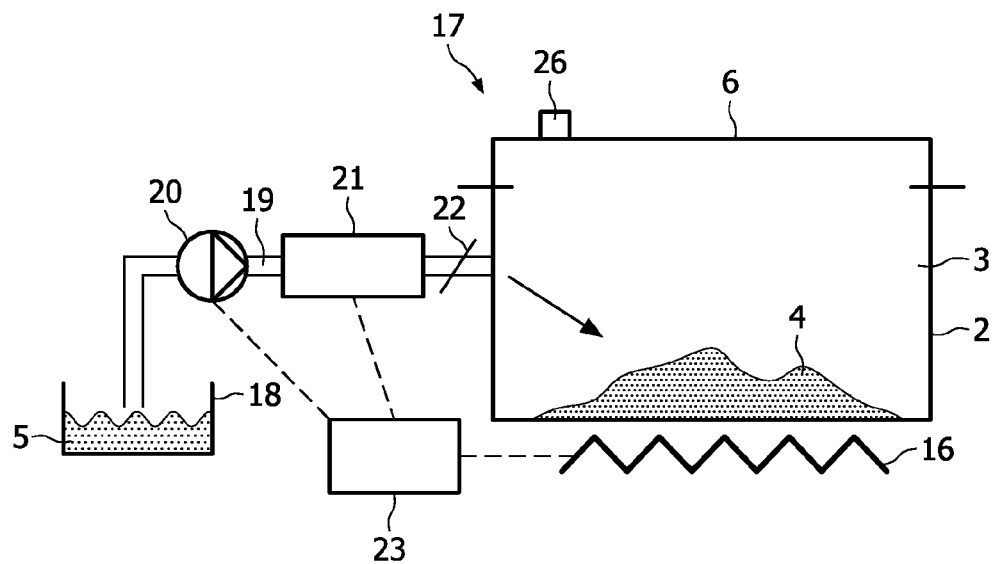
FIG. 3 diagrammatically shows a number of components of a rice cooker according to a first preferred embodiment of the present invention.

FIG. 3 shows components of a rice cooker 17 according to a first preferred embodiment of the present invention. Besides the bowl 2, the lid 6 and a heating element 16 that is positioned at the bottom of the bowl 2, the rice cooker 17 comprises a water reservoir 18 and a conduit 19 for conveying water 5 from the water reservoir 18 to the space 3 of the bowl 2. In the conduit 19, various components are arranged, in particular a pump 20 for forcing water 5 to flow from the water reservoir 18 in the direction of the bowl 2, a flow-through heater 21 for heating the water 5, and a one-way valve 22 by means of which overpressure in the space 3 of the bowl 2 may be maintained during a cooking process, even when the water reservoir 18 gets empty. Furthermore, the rice cooker 17 comprises a microcontroller 23, which is diagrammatically depicted as a block in FIG. 3, and which serves for controlling the operation of the various components of the rice cooker 17. A transmission of controlling signals from the microcontroller 23 to the various components of the rice cooker 17, in particular the heating element 16, the pump 20 and the flow through heater 21, is diagrammatically depicted by dashed lines in FIG. 3.

For the purpose of cooking a quantity of rice 4 by means of the rice cooker 17, a user puts the quantity of rice 4 in the bowl 2, and fills the water reservoir 18 with water 5. Subsequently, the user puts the lid 6 in the closed position, and attaches the lid 6 to the bowl 2. When the user provides a signal that the cooking process may be started, the microcontroller 23 is activated and operates the heating element 16, the pump 20 and the flow-through heater 21 in a manner as will now be described.

In the first place, the pump 20 is activated to pump water 5 from the water reservoir 18, and the flow-through heater 21 is activated to generate heat to such an extent that at a given pump speed, steam is formed, which steam passes the one-way valve 22 and enters the space 3 of the bowl 2. Inside the space 3, the rice 4 is heated up under the influence of the steam, and the actual cooking process is started, wherein a first quantity of boiling water is obtained on the basis of condensation of the steam.

In the second place, during the actual cooking process, hot water 5 is supplied to the space 3 of the bowl 2 to keep the cooking process going for a period of time and to use an appropriate quantity of water in the process. With respect to the first situation, in which formation of steam takes place in the flow-through heater 21, the power of the flow-through heater 21 is decreased and/or the pump speed is increased in order to realize a transition from a supply of steam to a supply of hot water. In particular, the pump 20 and the flow-through heater 21 are operated such that water 5 is heated to a temperature of approximately 120 to 135° C. at a pressure of approximately 2 to 3 bar. The heating element 16 is operated to heat the bowl 2 during the cooking process, but may also be used for keeping the rice 4 warm after the cooking process.

In the rice cooker 17 according to the present invention, the time period from activation of the rice cooker 17 to the end of a cooking process may be as short as approximately 7 to 12 minutes. The process of heating up of the rice 4 and initiating the actual cooking process does not need to take more than approximately 2 minutes, and the actual cooking process does not need to take more than 5 to 10 minutes, when the quantity of rice 4 is approximately 1 kg and the power is 1,400 W. In these conditions, generation of steam may be done by evaporating a total quantity of 70 ml water 5 in the flow-through heater 21, whereby enough steam for heating up the rice 4 is obtained. As has already been mentioned, this takes approximately 2 minutes. At 3,000 W power, heating up of the rice 4 may even be done in approximately 1 minute, so that an even further reduction of the time that is needed for putting the rice 4 to a cooked state may be realized. It is noted that a total quantity of water 5 that is heated up by the flow-through heater 21 during the actual cooking process and that is supplied to the space 3 of the bowl 2 may be approximately 1 liter, which is a suitable quantity for cooking 1 kg of rice 4.

Figure 4:
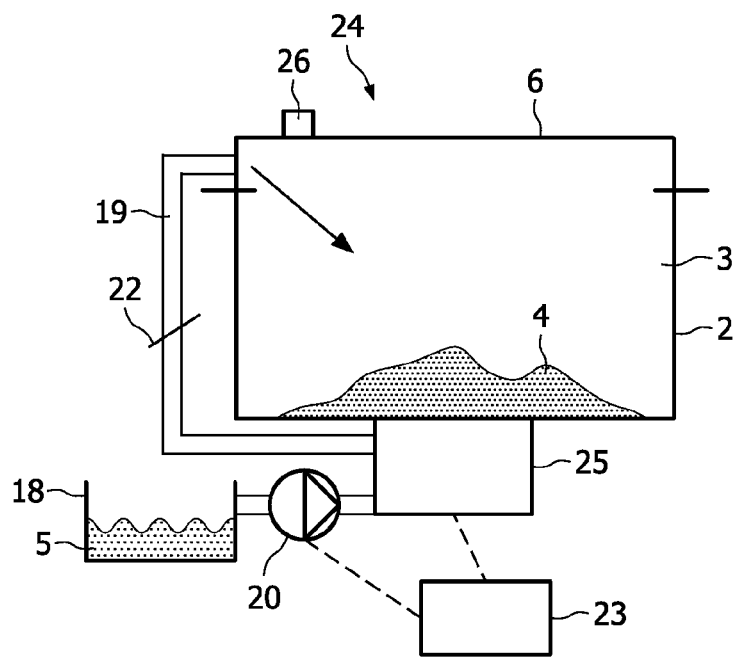
FIG. 4 diagrammatically shows a number of components of a rice cooker according to a second preferred embodiment of the present invention.

FIG. 4 shows components of a rice cooker 24 according to a second preferred embodiment of the present invention. In comparison with the rice cooker 17 according to the first preferred embodiment of the present invention, instead of the heating element 16 and the flow-through heater 21, the rice cooker 24 according to the second preferred embodiment of the present invention comprises a thermo block 25, which is arranged at the bottom of the bowl 2. In fact, the functions of the heating element 16 and the flow-through heater 21 are combined in the thermo block 25. Initially, the thermo block 25 is heated up, so that water 5 which is passed through the thermo block 25 may be heated to steam in a first instance, and may be heated to the boiling point in a second instance. In this respect, the thermo block 25 functions like a flow-through heater 21. After the cooking process, the hot thermo block 25 has the function of keeping the rice 4 warm, like the heating element 16 in the rice cooker 17 according to the first preferred embodiment of the present invention.

When a thermo block 25 is used, it is not necessary that this component is arranged at the bottom of the bowl 2. Instead, the thermo block 25 may be arranged at another position, while at least one separate heating component, for example a PTC heater, may be arranged at the bottom or an upright wall of the bowl 2 for the purpose of keeping the rice 4 warm after the cooking process. In any case, it is important that at least one suitable heater is applied for the purpose of heating up water 5 and generating steam. Examples of a suitable heater are a heating coil and an induction heater.

For the sake of completeness, it is noted that in FIG. 3 as well as in FIG. 4, a supply of steam and/or water to the space 3 of the bowl 2 is indicated by means of an arrow.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the Figures and the description, such illustration and description are to be considered illustrative or exemplary only, and not restrictive. The present invention is not limited to the disclosed embodiments.

In the shown examples of a device 17, 24 according to the present invention, a cooking process of food 4 is performed at a pressure which is higher than a normal ambient pressure of approximately 1 bar. In this way, reduction of the time of the actual cooking process, i.e. the process during which the food 4 is cooked under the influence of boiling water, is obtained. However, it is not necessary to have an overpressure. Due to the fact that the cooking process is initiated relatively fast by generating steam and supplying steam to the food 4, it is still possible to have a time reduction in comparison with any device according to the state of the art.

For the sake of completeness, it is noted that the device 17, 24 according to the present invention may be a rice cooker 17, 24 which is primarily intended for cooking rice 4. However, that does not mean that the present invention would not be applicable in cases of other types of food.

Advantageously, in a practical embodiment, the device 17, 24 according to the present invention comprises means for preventing the pressure prevailing in the space 3 of the bowl 2 from getting dangerously high. In particular, such means may be adapted to relieve the pressure, and may comprise a pressure relief valve, for example. In FIGS. 3 and 4, such a valve is diagrammatically depicted as a block, and is indicated by reference numeral 26. Within the scope of the present invention, any suitable means may be applied, and it is also possible that the means comprise a sensor which is coupled to the microcontroller 23.

Variations to the disclosed embodiments can be understood and effected by a person skilled in the art in practicing the claimed invention, from a study of the Figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

In the foregoing, a device 17, 24 for cooking food such as rice 4 is disclosed, which is adapted to perform a cooking process which is performed by heating the food 4 under the influence of boiling water during a period of time. The device 17, 24 comprises means 23 for controlling the operation of the device 17, 24, the controlling means 23 being adapted to operate components of the device 17, 24 in such a way that a total quantity of water 5 which is to be used in the cooking process is gradually supplied to the food 4, and the supply of a major portion of the total quantity of the water 5 being performed when the cooking process is already taking place. Preferably, the cooking process is initiated by evaporating a relatively small portion of the total quantity of the water 5 to steam, supplying this steam to the food 4, and allowing this steam to condense on the food 4.

The invention claimed is:

1. A device for cooking food in a container, comprising:
   a water supply unit configured to supply water for cooking the food;
   a heater configured to generate heat; and
   a controller configured to control an operation of the device, configured to operate the heater to initially supply the container with a first quantity of water in a form of steam during a first period of time of a cooking process, and configured to operate the heater to subsequently supply the container with a second quantity of water in a form of heated water during a second period of time of the cooking process, and wherein the second period of time is longer than the first period of time.

2. The device according to claim 1, wherein the container for accommodating the food is sealable.

3. The device according to claim 1, wherein the controller is further configured to operate the heater at different power levels during the cooking process, wherein a first power level during the first period of time is higher than a subsequent power level during the second period of time.

4. The device according to claim 1, wherein the controller is further configured to control a mass flow rate at which the water that is supplied to the container is made to flow through an area that is associated with the heater, wherein a first mass flow rate is lower than a subsequent mass flow rate.

5. The device according to claim 1, wherein the heater comprises a first heater being a flow-through heater for heating the water that is supplied to the container, and a second heater that that contacts the container for directly heating the container.

6. The device according to claim 1, wherein the heater comprises a thermo block that contacts the container for directly heating the container, and wherein the thermo block is configured to receive water from the water supply unit and supply at least one the steam and the heated water to the container through a conduit.

7. The device according to claim 1, further comprising a water reservoir and a pump to pump the water from the water reservoir in a direction of the container.

* * * * *